United States Patent
Choi

(10) Patent No.: US 8,002,422 B2
(45) Date of Patent: Aug. 23, 2011

(54) BACKLIGHT ASSEMBLY HAVING A DIFFUSER SUPPORTING MEMBER AND A LAMP SUPPORTING MEMBER AND DISPLAY APPARATUS HAVING THE SAME

(75) Inventor: Seong-Sik Choi, Seoul (KR)

(73) Assignee: Samsung Electronics Co., Ltd. (KR)

( * ) Notice: Subject to any disclaimer, the term of this patent is extended or adjusted under 35 U.S.C. 154(b) by 17 days.

(21) Appl. No.: 11/344,467

(22) Filed: Jan. 30, 2006

(65) Prior Publication Data
US 2006/0203480 A1   Sep. 14, 2006

(30) Foreign Application Priority Data
Mar. 9, 2005 (KR) .................. 10-2005-0019608

(51) Int. Cl.
G09F 13/08 (2006.01)
F21V 15/04 (2006.01)
F21V 17/06 (2006.01)

(52) U.S. Cl. .................. 362/97.4; 362/390; 362/433

(58) Field of Classification Search .................. 349/58, 349/60, 59, 64, 70; 362/235, 29, 561, 97, 362/632–634, 614, 581, 27, 249, 260, 97.1–97.4, 362/249.01, 217.1–217.17, 224–225, 85, 362/278, 320, 369, 390, 433, 450
See application file for complete search history.

(56) References Cited

U.S. PATENT DOCUMENTS

| | | | |
|---|---|---|---|
| 5,207,495 A * | 5/1993 | Ahlstone | 362/33 |
| 6,974,221 B2 * | 12/2005 | Wu et al. | 362/29 |
| 7,059,736 B2 * | 6/2006 | Yu et al. | 362/97.1 |
| 7,070,313 B2 * | 7/2006 | Kim et al. | 362/561 |
| 7,131,750 B2 * | 11/2006 | Liu et al. | 362/327 |
| 7,163,319 B2 * | 1/2007 | Kuo et al. | 362/306 |
| 7,163,328 B2 * | 1/2007 | Chang et al. | 362/561 |
| 7,255,462 B2 * | 8/2007 | Tseng | 362/330 |
| 7,309,142 B2 * | 12/2007 | Tseng et al. | 362/227 |
| 7,382,423 B2 * | 6/2008 | Chang et al. | 349/64 |
| 7,407,318 B2 * | 8/2008 | Chang | 362/632 |
| 2004/0228111 A1 * | 11/2004 | Kuo et al. | 362/31 |
| 2005/0225960 A1 * | 10/2005 | Tsai | 362/23 |
| 2005/0270803 A1 * | 12/2005 | Tsai et al. | 362/632 |
| 2006/0007707 A1 * | 1/2006 | Lee et al. | 362/632 |
| 2006/0018130 A1 * | 1/2006 | Lee | 362/632 |

* cited by examiner

*Primary Examiner* — Alan Cariaso
(74) *Attorney, Agent, or Firm* — Innovation Counsel LLP

(57) ABSTRACT

A backlight assembly includes a plurality of lamps to generate light, a diffusing plate, a receiving container and a first supporting member. The diffusing plate is placed over the lamps and diffuses the light. The receiving container has a bottom portion and a sidewall portion extending from the bottom portion to provide a receiving space that receives the lamps. The first supporting member is disposed on the bottom portion to support the diffusing plate, and has a first inclined portion and a second inclined portion. The first and second inclined portions can be inclined to each other, or oriented in any other manner that allows them to reduce the amount of shock forces transmitted from the diffusing plate to the bottom portion. Thus, shock resistance and manufacturability of the backlight assembly may be increased and display quality of the display apparatus may be improved.

16 Claims, 4 Drawing Sheets

BACKLIGHT ASSEMBLY HAVING A DIFFUSER SUPPORTING MEMBER AND A LAMP SUPPORTING MEMBER AND DISPLAY APPARATUS HAVING THE SAME

CROSS REFERENCE TO RELATED APPLICATION

This application relies for priority upon Korean Patent Application No. 2005-19608 filed on Mar. 9, 2005, the contents of which are herein incorporated by reference in their entirety.

BACKGROUND OF THE INVENTION

1. Field of the Invention

The present invention relates to liquid crystal displays. More particularly, the present invention relates to a backlight assembly for liquid crystal displays.

2. Description of the Related Art

In general, a liquid crystal display apparatus displays an image using optical and electrical properties of liquid crystal. The liquid crystal display apparatus has various advantages, such as light weight, low power consumption, low driving voltage, etc., in comparison with a display apparatus such as a cathode ray tube, a plasma display panel or the like. Therefore, the liquid crystal display apparatus is widely used in various electrical industries.

The liquid crystal display apparatus typically includes a liquid crystal display panel to display an image using a light transmittance of the liquid crystal, and a backlight assembly to provide the liquid crystal display panel with light.

The backlight assembly is commonly classified as either an edge illumination type backlight assembly or a direct illumination type backlight assembly, depending on the positions of light sources employed within the backlight assembly.

The edge illumination type backlight assembly includes a light guide plate, a lamp adjacent to an incident portion of the light guide plate, and a receiving container to receive the lamp. The light guide plate controls a path of the light incident through the incident portion and provides the light to the liquid crystal display panel.

The direct illumination type backlight assembly includes a plurality of lamps disposed under the liquid crystal display panel, a receiving container to receive the lamps, a diffusing plate disposed between the lamps and the liquid crystal display panel, and a reflecting plate disposed under the lamps. The diffusing plate diffuses light emitted from the lamps and light reflected by the reflecting plate, and the light diffused by the diffusing plate is provided to the liquid crystal display panel.

The direct illumination type backlight assembly further includes a supporter to support the diffusing plate and to separate the diffusing plate from a bottom face of the receiving container. The supporter has a lamp supporting portion to guide a receiving position of the lamps and a diffusing plate supporting portion to support the diffusing plate. In general, the lamp supporting portion has a U-shape, and the diffusing plate supporting portion has a conical shape.

However, when an impact is applied to the diffusing plate, the diffusing plate supporting portion does not absorb its energy well. As a result, the impact is applied to the lamps via the supporter, often breaking them. Further, since the diffusing plate supporting portion has a conical shape, the diffusing plate supporting portion scratches the diffusing plate, and noise is generated between the diffusing plate and the diffusing plate supporting portion.

SUMMARY OF THE INVENTION

Various aspects of the invention can be implemented in numerous ways. In one aspect of the present invention, a backlight assembly comprises a plurality of lamps to generate light, and a diffusing plate positioned over the lamps to diffuse the light. Also included is a receiving container having a bottom portion and a sidewall portion extended from the bottom portion, the bottom portion and the sidewall portion defining a receiving space, wherein the plurality of lamps is positioned within the receiving space. The assembly also includes a first supporting member placed on the bottom portion and supporting the diffusing plate, the first supporting member having a flat portion contacting the diffusing plate.

In another aspect of the present invention, a display apparatus comprises a plurality of lamps to generate light, and a diffusing plate positioned over the lamps to diffuse the light. Also included is a receiving container having a bottom portion and a sidewall portion extended from the bottom portion, the bottom portion and the sidewall portion defining a receiving space, wherein the plurality of lamps is positioned within the receiving space. The assembly also includes a supporting member placed on the bottom portion to support the diffusing plate, the supporting member having a first inclined portion and a second inclined portion inclined with respect to each other, the first and second inclined portions having a flexibility.

In another aspect of the invention, a display apparatus comprises a backlight assembly comprising a plurality of lamps to generate light, and a diffusing plate positioned over the lamps to diffuse the generated light. Also included in the backlight assembly is a receiving container having a bottom portion and a sidewall portion extended from the bottom portion, the bottom portion and the sidewall portion defining a receiving space, wherein the plurality of lamps is positioned within the receiving space. The backlight assembly also has a first supporting member placed on the bottom portion to support the diffusing plate, the first supporting member having a flat portion in contact with the diffusing plate, and a display panel over the backlight assembly to display an image from the generated light.

BRIEF DESCRIPTION OF THE DRAWINGS

The above and other advantages of the present invention will become readily apparent by reference to the following detailed description when considered in conjunction with the accompanying drawings wherein.

Like reference numerals refer to corresponding parts throughout the drawings. Also, it is understood that the depictions in the figures are diagrammatic and not necessarily to scale.

DESCRIPTION OF THE EMBODIMENTS

Hereinafter, embodiments of the present invention will be explained in detail with reference to the accompanying drawings.

Figure 1:
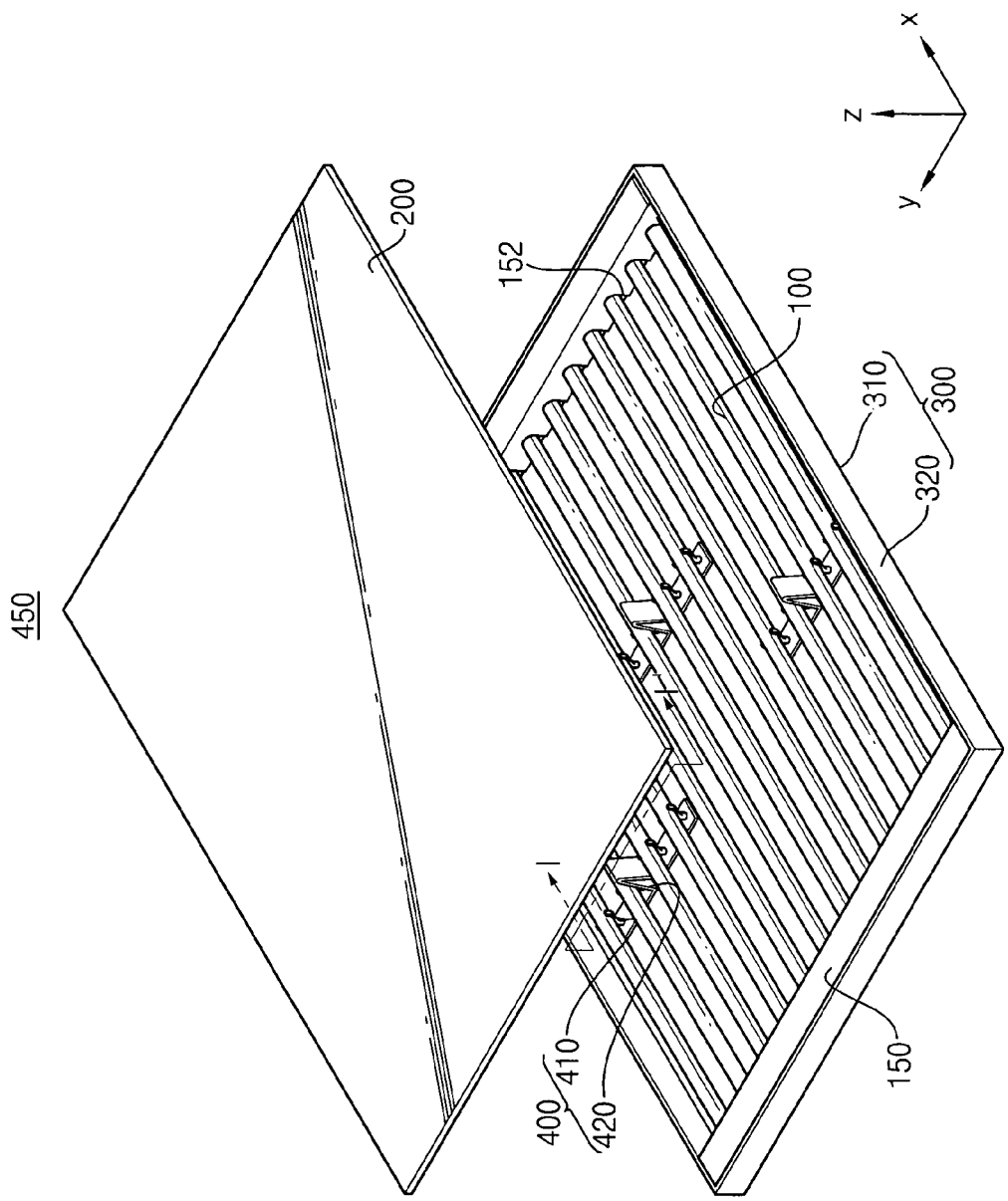
FIG. 1 is a perspective view showing a backlight assembly according to a first embodiment of the present invention.
Figure 2:
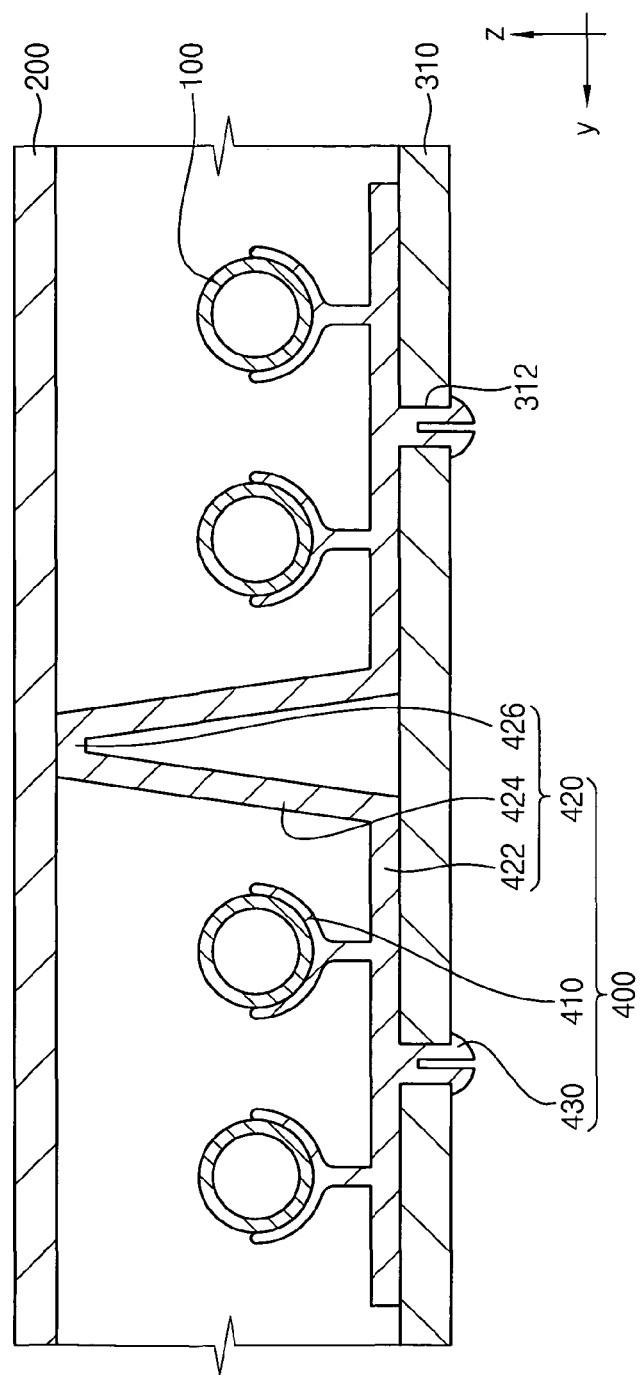
FIG. 2 is a cross-sectional view taken along a line I-I' in FIG. 1.

FIG. 1 is a perspective view showing a backlight assembly according to a first embodiment of the present invention. FIG. 2 is a cross-sectional view taken along a line I-I' in FIG. 1.

Referring to FIGS. 1 and 2, a backlight assembly 450 includes a plurality of lamps 100, a mold frame 150, a diffusing plate 200, a receiving container 300 and a supporting member 400. The backlight assembly 450 generates light having generally uniform brightness.

Each of the lamps 100 generates light and includes a cold cathode fluorescent lamp having a tubular shape. The lamps 100 have advantages such as low heat emission, long lift-time, etc. The lamps 100 are received in the receiving container 300. The lamps 100 are extended in an X-axis direction and arranged in a Y-axis substantially perpendicular to the X-axis. The lamps 100 are often arranged substantially parallel to each other. Alternately, the lamps 100 may include a U-shaped lamp or an external electrode fluorescent lamp (EEFL) having an external electrode.

Each of the lamps 100 has a lamp body from which light is generated and an electrode (not shown) to which a power voltage is applied. Receiving positions of the lamps 100 are guided by the supporting member 400, so that the lamps 100 are spaced apart from each other by a predetermined distance.

The lamp body often has a generally tubular shape, and a discharging gas (not shown) is charged in the lamp body. Further, a fluorescent layer (not shown) is formed on an inner surface of the lamp body.

The electrode is formed inside the lamp body and adjacent to two end portions of the lamp body. When the lamps include the EEFL, the electrode is formed on outer surfaces of the two end portions of the lamp body.

The electrode is electrically connected to an electrical wire (not shown) and receives power from an external inverter (not shown). When power is applied to the electrode, a plurality of electrons is generated from the electrode. The electrons collide with the discharging gas injected into the lamp body, generating ultraviolet light. The ultraviolet light is converted to visible light while passing through the fluorescent layer, and the visible light is emitted from the lamp body.

The mold frame 150 includes a first mold frame to cover first end portions of the lamps 100 and a second mold frame to cover second end portions of the lamps 100. The first and second mold frames are received in the receiving container 300 and protect the electrodes of the lamps 100. In the present embodiment, the first and second mold frames may have a cross-sectional structure of an L-shape or a U-shape. The first and second mold frames also have a plurality of lamp fixing grooves 152 to guide the receiving positions of the lamps 100.

The diffusing plate 200 is disposed over the lamps 100 and diffuses the light generated from the lamps 100. The diffusing plate 200 has a plate-like shape and includes a synthetic resin capable of diffusing the light, such as polymethylmethacrylate. Two end portions of the diffusing plate 200 are disposed on upper end portions of the first and second mold frames, respectively. A middle portion of the diffusing plate 200 is supported by the supporting member 400, thereby preventing the diffusing plate 200 from sagging.

The receiving container 300 includes a bottom portion 310 and a sidewall portion 320 extended from an edge of the bottom portion 310 to provide a receiving space. The lamps 100, the mold frame 150 and the supporting member 400 are received in the receiving space of the receiving container 300.

Although not shown in FIG. 1, a reflecting plate may be disposed on the bottom portion. The reflecting plate reflects the light generated by the lamps 100 to the diffusing plate 200.

The supporting member 400 has a first supporting member 420, a plurality of second supporting members 410 and a fixing portion 430. The first supporting member 420 supports the diffusing plate 200 and the second supporting members 410 support the lamps 100. The first supporting member 420 is integrally formed with the second supporting members 410. Further, the fixing portion 430 fixes the supporting member 400 to the receiving container 300.

The first supporting member 420 is disposed on the bottom portion 310 to support the diffusing plate 200. The first supporting member 420 includes a body portion 422, an inclined portion 424 and a connecting portion 426.

The body portion 422 includes a first body portion and a second body portion spaced apart from the first body portion. The first and second body portions make contact with the bottom portion 310 of the receiving container 300. The inclined portion 424 has a first inclined portion and a second inclined portion facing the first inclined portion. A shape of the inclined portion 424 may be changed when a pressure caused by the diffusing plate 200 is applied to the inclined portion 424. That is, the flexibility of the first supporting member 420 reduces the amount of impact forces transmitted from the diffusing plate 200. Further, an inside space of the inclined portion 424 is empty.

The connecting portion 426 connects the first inclined portion with the second inclined portion and makes contact with the diffusing plate 200 to support the diffusing plate 200.

As above described, the first supporting member 420 supports the middle portion of the diffusing plate 200 to thereby prevent sagging of the diffusing plate 200. Further, since the inclined portion 424 may deflect upon an impact applied to the diffusing plate 200, the first supporting member 420 may absorb the energy of the impact.

In addition, the first supporting member 420 includes a connecting portion 426 contacting the diffusing plate 200, thereby reducing noise between the first supporting member 420 and the diffusing plate 200.

In order to transmit light from the lamps 100, the first supporting member 420 may include a transparent material having approximately the same transmittance refractive index as the diffusing plate 200.

The second supporting members 410 protrude from the body portion 422 of the first supporting member 420 in a Z-direction and are disposed generally in parallel with each other. Each of the second supporting members 410 has a U-shape, and the lamps 100 are received in the second supporting members 410. As a result, the lamps 100 are spaced apart from the bottom portion 310 of the receiving container 300 by the height of the second supporting member 410.

In order to transmit light from the lamps 100, the second supporting members 410 may include a transparent material. The second supporting members 410 support middle portions of the lamps 100, thereby preventing the lamps 100 from sagging.

The fixing portion 430 protrudes from a lower surface of the body portion 422 of the first supporting member 420. A fixing hole 312 is formed in the bottom portion 310 of the receiving container 300 so as to align with the fixing portion 430. Accordingly, the supporting member 400 is fixed to the bottom portion 310 by the fixing portion 430. In order to increase fixing force between the fixing portion 430 and the bottom portion 310, the supporting member 400 may include a plurality of fixing portions 430.

In the present embodiment, since the first supporting member 420 has a curved shape, the supporting member 400 may absorb the energy of an external impact applied via the diffusing plate 200, thus preventing damage to the lamps 100.

In FIGS. 1 and 2, the first supporting member 420 is curved in a generally trapezoidal shape, but the first supporting member 420 may be curved in any other shape that supports the diffusing plate 200 and absorbs impact energy therefrom. For example, the first supporting member 420 may have a generally round shape.

The backlight assembly 450 may further include a reflecting plate (not shown). The reflecting plate is disposed on the bottom portion 310 of the receiving container 300 and reflects light from the lamps 100 toward the diffusing plate 200. Alternatively, the backlight assembly 450 may include a metal layer coated on the bottom portion 310 to reflect light from the lamps 100 toward the diffusing plate 200.

Figure 3:
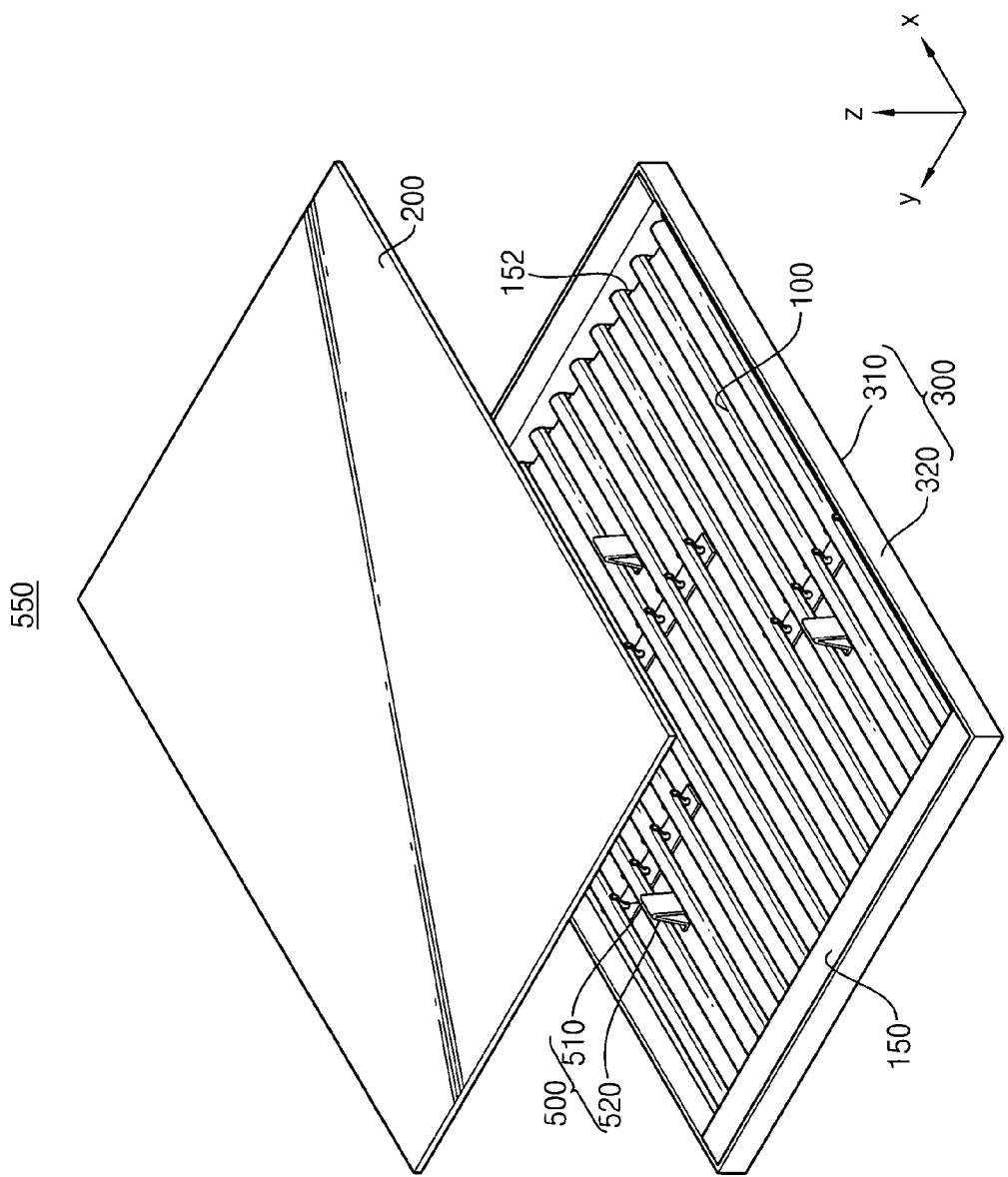
FIG. 3 is a perspective view showing a backlight assembly according to a second embodiment of the present invention.

FIG. 3 is a perspective view showing a backlight assembly according to a second embodiment of the present invention. In FIG. 3, the same reference numerals denote corresponding elements from FIGS. 1 and 2, and thus any further repetitive descriptions of the same elements will be omitted.

Referring to FIG. 3, a backlight assembly 550 includes the lamps 100, the mold frame 150, the diffusing plate 200, the receiving container 300 and a supporting member 500.

The supporting member 500 includes a first supporting member 520 to support the diffusing plate 200 and a plurality of second supporting members 510 to support the lamps 100. The first supporting member 520 can be spaced apart from the second supporting members 510 as shown.

The first supporting member 520 is disposed on the bottom portion 310 of the receiving container 300 and supports the diffusing plate 200. The first supporting member 520 includes a body portion, an inclined portion and a connecting portion.

The body portion includes a first body portion and a second body portion spaced apart from the first body portion. The first and second body portions make contact with the bottom portion 310 of the receiving container 300. The inclined portion has a first inclined portion and a second inclined portion. The connecting portion connects the first inclined portion with the second inclined portion and makes contact with the diffusing plate 200 to support the diffusing plate 200.

As in the previous embodiment, the first supporting member 520 has a generally trapezoidal cross-sectional shape. Alternatively, the first supporting member 520 may have another shape conducive to absorption of energy, such as a generally round shape.

The second supporting members 510 are separated from the first supporting member 520 and disposed on the bottom portion 310 of the receiving container 300. The second supporting members 510 are disposed substantially in parallel with each other. Each of the second supporting members 510 has a U-shape, and the lamps 100 are received in the second supporting members 510.

Similar to FIG. 2, a first fixing portion (not shown) is formed in the first supporting member 520 so as to fix the first supporting member 520 to the receiving container 300, and a second fixing portion (not shown) is formed in the second supporting member 510 so as to fix the second supporting member 510 to the receiving container 300. A first fixing hole (not shown) is formed through the bottom portion 310 of the receiving container 300 corresponding to the first fixing portion. A second fixing hole (not shown) is formed through the bottom portion 310 of the receiving container 300 corresponding to the second fixing portion. As the first and second fixing portions are coupled to the first and second fixing holes, respectively, the first and second supporting members 520 and 510 may be fixed to the bottom portion 310. According to the above, the first supporting member 520 is separated from the second supporting member 510, thereby preventing them from contacting each other during an impact.

Figure 4:
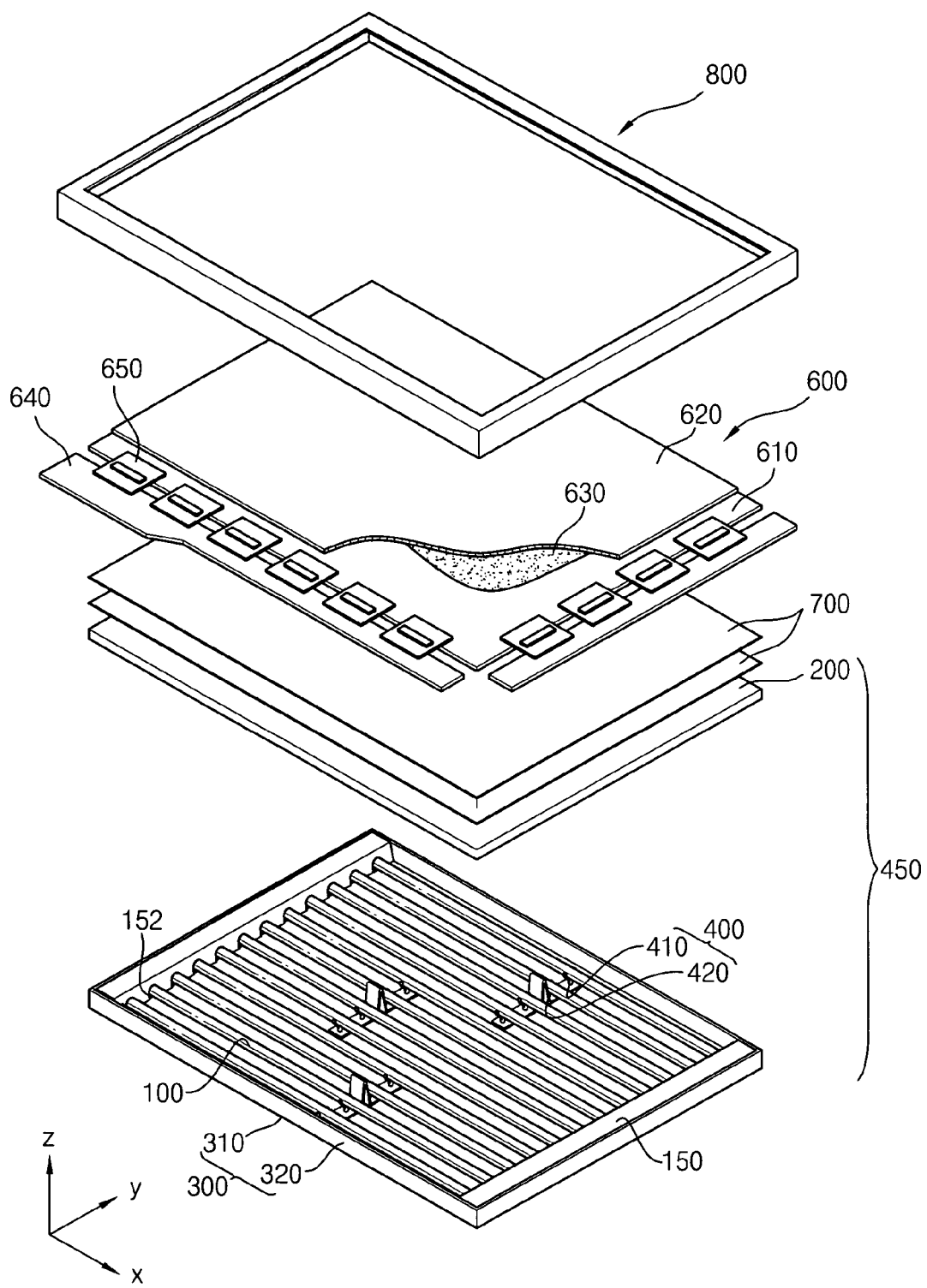
FIG. 4 is an exploded perspective view showing a display apparatus according to an embodiment of the present invention.

FIG. 4 is an exploded perspective view showing a display apparatus according to an embodiment of the present invention. In FIG. 4, the same reference numerals denote corresponding elements in FIGS. 1 and 2, and thus any further repetitive descriptions of the same elements will be omitted.

Referring to FIG. 4, a display apparatus includes the backlight assembly 450, a display panel 600, an optical member 700 and a top chassis 800.

The display panel 600 is disposed over the backlight assembly 450 and displays an image using the light generated from the backlight assembly 450. The display panel 600 includes a first substrate 610, a second substrate 620, a liquid crystal layer 630, a printed circuit board 640 and a flexible printed circuit board 650.

The first substrate 610 has a plurality of pixel electrodes, a plurality of thin film transistors and a plurality of signal lines. The pixel electrodes are disposed in a matrix shape, and the thin film transistors apply a driving voltage to them. The thin film transistors are turned on in response to a signal applied through the signal lines.

The pixel electrodes include a transparent conductive material, such as indium tin oxide (ITO), indium zinc oxide (IZO), amorphous indium tin oxide (a-ITO), etc. They are formed by performing a photolithography process on the transparent and conductive material.

The second substrate 620 faces the first substrate 610 and includes a common electrode and a plurality of color filters. The common electrode is formed over the second substrate 620 and includes a transparent and conductive material. The color filters are formed in areas corresponding to the pixel electrodes, respectively.

The color filter includes a red color filter, a green color filter and a blue color filter. The red color filter selectively transmits red light of white light, the green color filter selectively transmits green light of the white light and the blue color filter also selectively transmits blue light of the white light.

The liquid crystal layer 630 is formed between the first substrate 610 and the second substrate 620. The liquid crystal layer 630 includes liquid crystal molecules arranged by an electric field formed between the pixel electrodes and the common electrode. Therefore, the liquid crystal layer 630 selectively passes light supplied from the backlight assembly 450, after which the light passes through the color filters. As a result, the display panel 600 may display an image using the light supplied from the backlight assembly 450.

The printed circuit board 640 includes a driving circuit unit to which an image signal is applied. The driving circuit unit changes the image signal into a driving signal in known manner, so as to control the thin film transistors.

The flexible printed circuit board 650 electrically connects the printed circuit board 640 with the first substrate 610 to provide the first substrate 610 with the driving signal generated by the printed circuit board 640. The flexible printed circuit board 650 is curved in an L-shape or a U-shape, so that the printed circuit board 640 is disposed adjacent to a side portion or a bottom portion of the display panel 600.

The optical member 700 is disposed between the backlight assembly 450 and the display panel 600 so as to improve optical characteristics of the light generated by the backlight assembly 450. In the present embodiment, the optical member 700 includes at least two prism sheets to reflect or refract the light emitted from the backlight assembly 450, thereby improving brightness in the vertical direction relative to the user.

The top chassis 800 covers an edge of the display panel 600 and is coupled to a sidewall portion 320 of the receiving container 300, so that the display panel 600 may be fixed to the backlight assembly 450 by the top chassis 800. The top chassis 800 may also prevent damage to the display panel 600 and movement of the display panel 600.

Although not shown in FIG. 4, a middle frame may be disposed between the display panel 600 and the optical member 700. The middle frame supports the display panel 600 and fixes the optical member 700 to the mold frame 300.

Backlight assemblies constructed as above offer distinct advantages. For instance, as the first supporting member has an elasticity by the first and second inclined portion, the first supporting member may better absorb the energy of an impact applied from an exterior through the diffusing plate. Therefore, the backlight assembly is more durable and prone to better manufacturing yield. In addition, the display quality of the display apparatus may be improved.

Further, the first supporting member has the connecting portion making contact with the diffusing plate, thereby reducing noise generated between the diffusing plate and the diffusing plate supporting portion.

Furthermore, the first supporting member can be separated from the second supporting member, thereby preventing damage to the lamp due to the externally applied impact through the diffusing plate.

Although exemplary embodiments in accordance with the present disclosure of invention have been described, it is understood that the present disclosure of invention should not be limited to these exemplary embodiments but various changes and modifications can be made by one ordinary skilled in the art after having read the disclosure where the changes are within the spirit and scope of the present teachings.

What is claimed is:

1. A backlight assembly, comprising:
   a plurality of lamps to generate light;
   a diffusing plate positioned over the lamps to diffuse the light;
   a receiving container having a bottom portion and a sidewall portion extended from the bottom portion, the bottom portion and the sidewall portion defining a receiving space, wherein the plurality of lamps is positioned within the receiving space;
   a first supporting member placed on the bottom portion and supporting the diffusing plate, the first supporting member being flexible and including a first inclined portion, a second inclined portion and a diffuser contacting portion connecting the first and the second inclined portions; and
   a plurality of second supporting members to support the lamps,
   wherein the diffuser contacting portion is disposed on top of the first and the second inclined portions and is contacting with the diffusing plate to support the diffusing plate,
   wherein the diffuser contacting portion of the first supporting member is disposed to be positioned between an otherwise side-by-side adjacent pair of lamps that are supported by said second supporting members, and
   wherein the inclined portions and the diffuser contacting portion and the bottom portion define and surround an empty space and the inclined portions are thus capable of flexing toward the empty space beneath them in response to impact forces transmitted from the diffusing plate to the diffuser contacting portion.

2. The backlight assembly of claim 1, wherein the first supporting member has a generally trapezoidal shape.

3. The backlight assembly of claim 1, wherein the first supporting member further comprises:
   a first body portion extending from the first inclined portion and contacting the bottom portion; and
   a second body portion extending from the second inclined portion and contacting the bottom portion, the second body portion being spaced apart from the first body portion.

4. The backlight assembly of claim 3, wherein the first supporting member further comprises at least one fixing portion protruding from at least one of the first and second body portions, the fixing portion configured to fix the first supporting member to the bottom portion.

5. The backlight assembly of claim 4, wherein the receiving container has at least one fixing hole formed through the bottom portion and corresponding to the fixing portions.

6. The backlight assembly of claim 1, wherein the first supporting member is integrally formed with the plurality of second supporting members.

7. The backlight assembly of claim 6, wherein each second supporting member of the plurality of second supporting members has a general U-shape.

8. A backlight assembly comprising:
   a plurality of lamps to generate light;
   a diffusing plate positioned over the lamps to diffuse the light;
   a receiving container having a bottom portion and a sidewall portion extended from the bottom portion, the bottom portion and the sidewall portion defining a receiving space, wherein the plurality of lamps is positioned within the receiving space; and
   a first supporting member placed on the bottom portion to support the diffusing plate, the first supporting member having a flexible first inclined portion, a flexible second inclined portion and a diffuser contacting portion connecting the first and the second inclined portions; and
   a plurality of second supporting members to support the lamps,
   wherein the first wherein the diffuser contacting portion of the first supporting member is disposed to be positioned between a side-by-side adjacent pair of lamps and wherein the inclined portions, the diffuser contacting portion and the bottom portion define and surround an empty space such that the flexible inclined portions are capable of flexing down into the empty space in response to impact forces transmitted from the diffusing plate to the diffuser contacting portion.

9. The backlight assembly of claim 8, wherein the first supporting member has a generally trapezoid shape.

10. A display apparatus comprising:
    a backlight assembly comprising:
      a plurality of lamps to generate light;
      a diffusing plate positioned over the lamps to diffuse the generated light;
      a receiving container having a bottom portion and a sidewall portion extended from the bottom portion, the bottom portion and the sidewall portion defining a receiving space, wherein the plurality of lamps is positioned within the receiving space; and
      a first supporting member placed on the bottom portion to support the diffusing plate, the first supporting member having a flexible first inclined portion, a flexible second inclined portion and a diffuser contacting portion connecting the first and the second inclined portions; and a plurality of second supporting members to support the lamps; and a display panel over the backlight assembly to display an image from the generated light, wherein the diffuser contacting portion is disposed on top of the first and the second inclined portions and is contacting with the diffusing plate to support the diffusing plate, wherein the diffuser contacting portion of the first supporting member is disposed to be positioned between a side-by-side adjacent pair of lamps and wherein the inclined portions, the diffuser contacting portion and the bottom portion define and surround an empty space and wherein the flexible inclined portions are capable of flexing down into the empty space in response to impact forces transmitted from the diffusing plate to the diffuser contacting portion.

11. The display apparatus of claim 10, wherein the first supporting member has a generally trapezoid_shape.

12. The display apparatus of claim 10, wherein the first supporting member comprises:

a first body portion extending from the first inclined portion and contacting the bottom portion; and a second body portion extending from the second inclined portion and contacting the bottom portion, the second body portion being positioned apart from the first body portion.

13. The display apparatus of claim 12, wherein the first supporting member further comprises at least one fixing portion protruding from the first and second body portions to fix the first supporting member to the bottom portion.

14. The display apparatus of claim 13, wherein the receiving container comprises at least one fixing hole formed through the bottom portion and corresponding to the fixing portions.

15. The display apparatus of claim 10, wherein the first supporting member is integrally formed with the second supporting members.

16. The display apparatus of claim 15, wherein each second supporting member of the plurality of second supporting members has a substantially U-shaped shape.

* * * * *